(12) United States Patent
Doan et al.

(10) Patent No.: US 11,185,981 B2
(45) Date of Patent: Nov. 30, 2021

(54) ROBOT CONTROL APPARATUS, ROBOT CONTROL METHOD, AND PROGRAM

(71) Applicant: Nidec Corporation, Kyoto (JP)

(72) Inventors: Thanh Nhat Doan, Kyoto (JP); Masahiro Yoshida, Kyoto (JP); Haruhiro Tsuneta, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 278 days.

(21) Appl. No.: 16/352,984

(22) Filed: Mar. 14, 2019

(65) Prior Publication Data

US 2019/0291272 A1 Sep. 26, 2019

(30) Foreign Application Priority Data

Mar. 26, 2018 (JP) .............................. JP2018-058527

(51) Int. Cl.
*B25J 9/16* (2006.01)
*B25J 9/06* (2006.01)

(52) U.S. Cl.
CPC ............... *B25J 9/1651* (2013.01); *B25J 9/06* (2013.01); *B25J 9/1664* (2013.01)

(58) Field of Classification Search
CPC .......... B25J 9/1651; B25J 9/06; B25J 9/1664
See application file for complete search history.

(56) References Cited

U.S. PATENT DOCUMENTS 6,092,004 A * 7/2000 Harima ................ G05B 19/416 700/252
2007/0030271 A1* 2/2007 Kamiya ................. B25J 9/1664 345/442

FOREIGN PATENT DOCUMENTS

JP 2004-252814 A 9/2004

OTHER PUBLICATIONS

Current claim set for the copending U.S. Appl. No. 16/352,988.*
Edward et al., Predictive joint motion limiting in robotic applications, Brigham Young University, 2003, vol. 21, pp. 531-540 (Year: 2003).*
Doan et al., "Robot Control Apparatus, Robot Control Method, and Program," U.S. Appl. No. 16/352,988, filed Mar. 14, 2019.

* cited by examiner

*Primary Examiner* — Khoi H Tran
*Assistant Examiner* — Nhi Q Bui
(74) *Attorney, Agent, or Firm* — Keating & Bennett

(57) ABSTRACT

A robot control apparatus includes a section setter to set, on a straight line connecting a start point to an end point, an acceleration section until reaching a predetermined angular velocity, a constant velocity section in which the predetermined angular velocity is maintained, and a deceleration section in which the predetermined angular velocity is decreased, a segment setter to divide each of the acceleration section, the constant velocity section, and the deceleration section into a plurality of segments and to set segment distances of each of the acceleration section, the constant velocity section, and the deceleration section so as to equalize or substantially equalize moving times of the segments of the reference point to each other, and when the reference point is moved in each of the segments according to point to point control, an angular velocity setter to set an angular velocity of each of the segments based on a variance in an angle of a joint which becomes maximum with respect to each of the segments in each of the acceleration section, the constant velocity section, and the deceleration section.

6 Claims, 12 Drawing Sheets

PTP

EMBODIMENT

BEFORE ADJUSTMENT OF SEGMENT

AFTER ADJUSTMENT OF SEGMENT

ROBOT CONTROL APPARATUS, ROBOT CONTROL METHOD, AND PROGRAM

CROSS REFERENCE TO RELATED APPLICATION

This application claims the benefit of priority to Japanese Patent Application No. 2018-058527 filed on Mar. 26, 2018. The entire contents of this application are hereby incorporated herein by reference.

FIELD OF THE DISCLOSURE

The present disclosure relates to a robot control apparatus, a robot control method, and a program.

BACKGROUND

Conventionally, point to point (PTP) control is known as a path control method of moving a position of a distal end of an arm (an end of a hand) of a robot from a start point (teaching point) to an end point (teaching point). Further, linear interpolation control of moving the position of the distal end of the arm of the robot along a linear path is known.

The conventional robot control apparatus includes a robot speed calculation device having a part for acquiring current position information on a robot, a part for acquiring maximal rated speed information on a joint of the robot, and a part for calculating a permissible speed limit that can be taken in a linear interpolation operation on the distal end of the robot on the basis of the current position information on the robot and the maximal rated speed information on the joint.

Further, whether an interpolation type of two before and after movement sections is switched from a joint interpolation operation to a linear interpolation operation or from the linear interpolation operation to the joint interpolation operation is determined, and when the distal end of the arm passes a connection point between the two before and after movement sections or passes through the vicinity of the connection point, whether a speed combination process is possible is determined. In some cases, when it is determined that the speed combination process is possible, an interpolation point for performing a combination of speeds between different types of interpolation operations may be determined by a joint parameter.

When a distal end of an arm of a robot is moved from a start point to an end point, PTP control is applied to minimize a moving time. However, since a movement path is not ensured in the PTP control, the distal end of the arm has the possibility of a collision with other objects or walls in a working space of the robot.

In linear interpolation control, the distal end of the arm of the robot can be moved on a linear path, and the movement path from the start point to the end point can be ensured. However, conventionally, the distal end of the arm of the robot cannot be moved at a high speed.

SUMMARY

According to an example embodiment of the present disclosure, a robot control apparatus for moving a reference point of an articulated robot including a plurality of joints from a start point to an end point by a linear interpolation includes a section setter to set, on a straight line connecting the start point to the end point, an acceleration section in which the reference point is accelerated from the start point to reach a predetermined angular velocity, a constant velocity section in which the reference point is maintained at the predetermined angular velocity, and a deceleration section in which the reference point is decelerated from the predetermined angular velocity to reach the end point. The robot control apparatus includes a segment setter to divide each of the acceleration section, the constant velocity section, and the deceleration section into a plurality of segments and to set segment distances of each of the acceleration section, the constant velocity section, and the deceleration section so as to equalize or substantially equalize moving times of the segments of the reference point to each other. The robot control apparatus includes, when the reference point is moved in each of the segments according to point to point (PTP) control, an angular velocity setter to set an angular velocity of each of the segments based on a variance in an angle of a joint of which angular variance becomes maximum with respect to each of the segments in each of the acceleration section, the constant velocity section, and the deceleration section.

The above and other elements, features, steps, characteristics and advantages of the present disclosure will become more apparent from the following detailed description of example embodiments with reference to the attached drawings.

DETAILED DESCRIPTION

Hereinafter, robot systems each including a robot control apparatus according to example embodiments of the present disclosure will be described.

In the robot system according to each of the example embodiments, a distal end of an arm of a robot, i.e., a position which is an attachment reference of an end effector as a reference point of the robot, is controlled to be moved by linear interpolation control from a start point to an end point. In the linear interpolation control, a straight line connecting the start point to the end point is divided into a plurality of segments, and the robot is operated by point to point (PTP) control in each of the plurality of segments. In this case, a PTP operation in each of the segments optimally determines an angular velocity in each of the segments as a constant angular velocity, thereby implementing a high-speed pseudo-linear motion.

In the following description, the reference point of the robot means a position of the robot which is a reference point of a teaching point of the robot such as an approaching point, a target point, or a departure point of the robot. For example, the reference point is a tool center point (TCP).

In the following description, movement of the robot between two points means that the reference point of the robot is moved between the two points.

Figure 1:
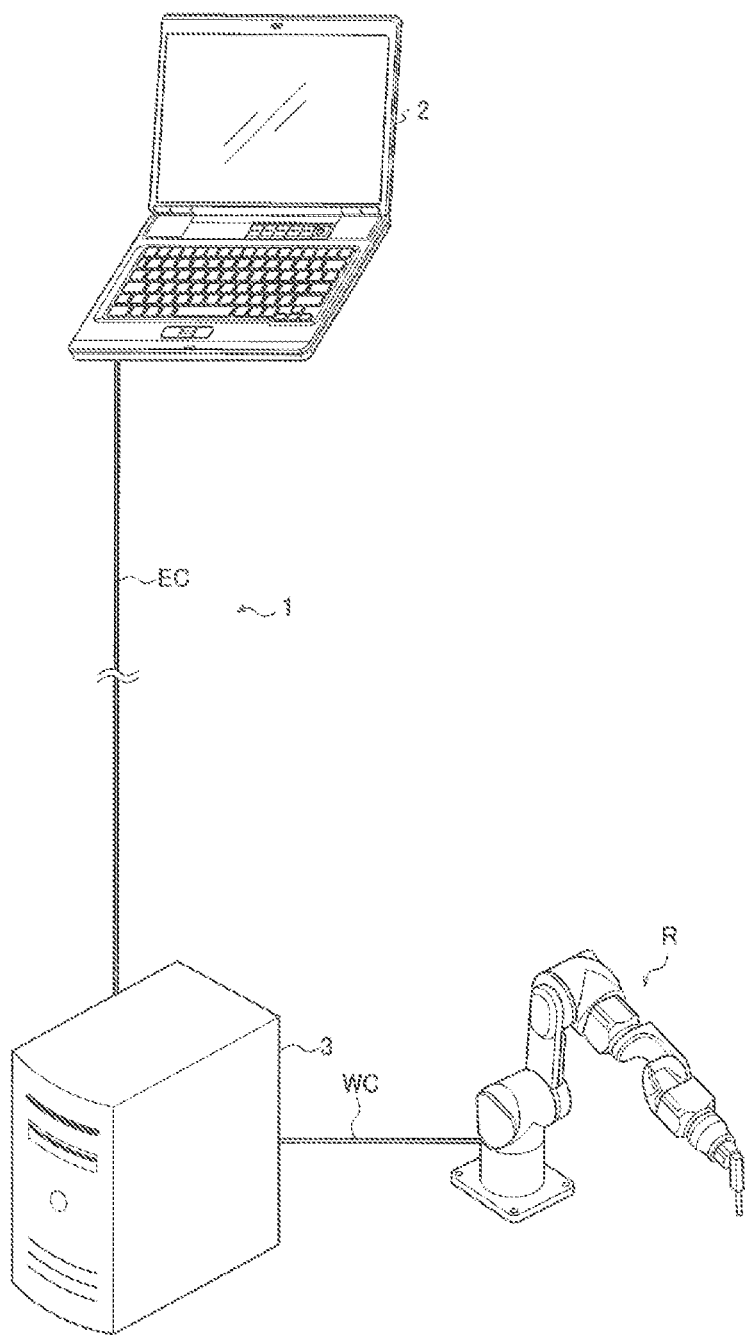
FIG. 1 is a schematic diagram illustrating a configuration of a robot system according to a first example embodiment of the present disclosure.
Figure 2:
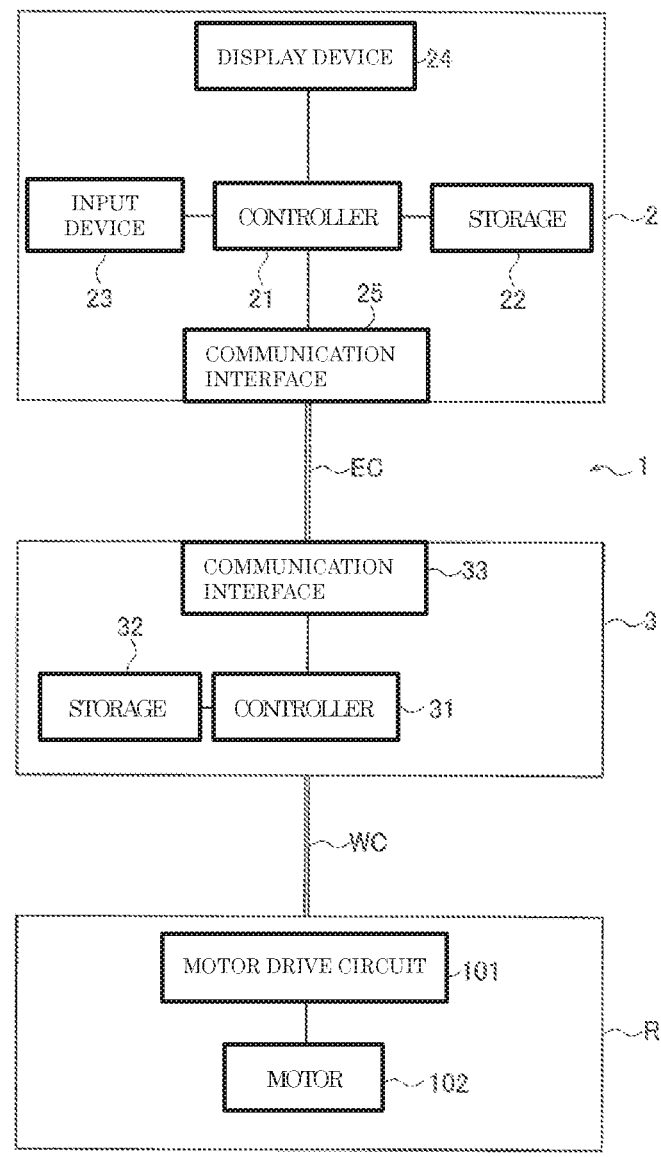
FIG. 2 is a diagram illustrating an internal configuration of the robot system according to the first example embodiment of the present disclosure.

A configuration of a robot system 1 of a first example embodiment will be described first with reference to FIGS. 1 and 2. FIG. 1 is a schematic diagram illustrating a configuration of a robot system 1 according to the present example embodiment. FIG. 2 is a diagram illustrating an internal configuration of the robot system 1 according to the present example embodiment.

As shown in FIG. 1, the robot system 1 includes an information processor 2, a robot control apparatus 3, and a robot R. For example, the information processor 2 is connected to communicate with the robot control apparatus 3 through, for example, an Ethernet (registered trademark) cable EC.

For example, the information processor 2 is a device for teaching the robot R installed at a factory line how to operate. The information processor 2 is installed to allow an operator to perform teaching. The information processor 2 may be disposed at a position away from a factory or the like in which the robot R is installed (e.g., a work place of the operator separated from the factory).

For example, the information processor 2 is a personal computer device or a tablet computer device. The information processor 2 is installed to allow the operator to perform off-line teaching or on-line teaching. A predetermined teaching program is executed such that a teaching point or an operating parameter of the robot R is determined.

The robot control apparatus 3 controls the robot R by executing a robot program on the basis of the teaching point or the operating parameter of the robot R transmitted from the information processor 2. As the result of the execution of the robot program, the robot control apparatus 3 transmits control pulses for a plurality of motors, which operate joints of the robot R, to the robot R.

The robot R is an articulated robot including a plurality of joints. The robot R drives the motors of the joints in response to the control pulses received from the robot control apparatus 3 to perform an operation according to the teaching point or the operating parameter determined by the information processor 2.

Referring to FIG. 2, the information processor 2 includes a controller 21, a storage 22, an input device 23, a display device 24, and a communication interface 25.

The controller 21 includes a central processing unit (CPU), a read only memory (ROM), and a random access memory (RAM). Teaching software is stored in the ROM. The CPU executes the teaching software stored in the ROM by deploying the teaching software in the RAM. The teaching point or the operating parameter of the robot R set by the operator through the teaching software is installed in the robot program.

The storage 22 is a mass storage device such as a hard disk drive (HDD) or a solid state drive (SSD) and is configured to be sequentially accessible by the CPU of the controller 21. The robot program is stored in the storage 22.

The input device 23 is a device for receiving a manipulation input by the operator and includes a pointing device.

The display device 24 is a device for displaying an execution result of the teaching software and includes a display drive circuit and a display panel.

The communication interface 25 includes a communication circuit for performing Ethernet communication between the information processor 2 and the robot control apparatus 3. The controller 21 transmits the robot program including the teaching point or the operating parameter of the robot R to the robot control apparatus 3 via the communication interface 25 according to a request for executing a simulation of the robot R or for operating a practice of the robot R by the operator.

As shown in FIG. 2, the robot control apparatus 3 includes a controller 31, a storage 32, and a communication interface 33.

The controller 31 includes a CPU, a ROM, and a RAM. The CPU executes the robot program that is received from the information processor 2 and stored in the storage 32 by deploying the robot program in the RAM. The CPU of the controller 31 executes the robot program such that functions, which will be described below, are realized.

The controller 31 generates control pulses for operating the motors of the joints of the robot R at every predetermined time (e.g., every 1 ms) to supply the control pulses to the robot R.

The storage 32 is a mass storage device such as an HDD or an SSD and is configured to be sequentially accessible by the CPU of the controller 31. In the storage 32, the robot program, which is received from the information processor 2, and execution log data, which is an execution record of the robot program, are stored.

The communication interface 33 includes a communication circuit for performing Ethernet communication between the information processor 2 and the robot control apparatus 3.

As shown in FIG. 2, the robot R includes a motor drive circuit 101 and a motor 102. The motor drive circuit 101 generates a drive voltage necessary to drive the motor 102 in response to the control pulse supplied from the robot control apparatus 3. The number of motors 102 to be installed matches the number of joints for operating the robot R.

A case in which the robot R is a six-axis vertical articulated robot will be described below. In this case, the motors 102 for driving six joints are installed at the robot R, and a drive voltage is supplied to each of the motors 102 from the motor drive circuit 101.

Figure 3:
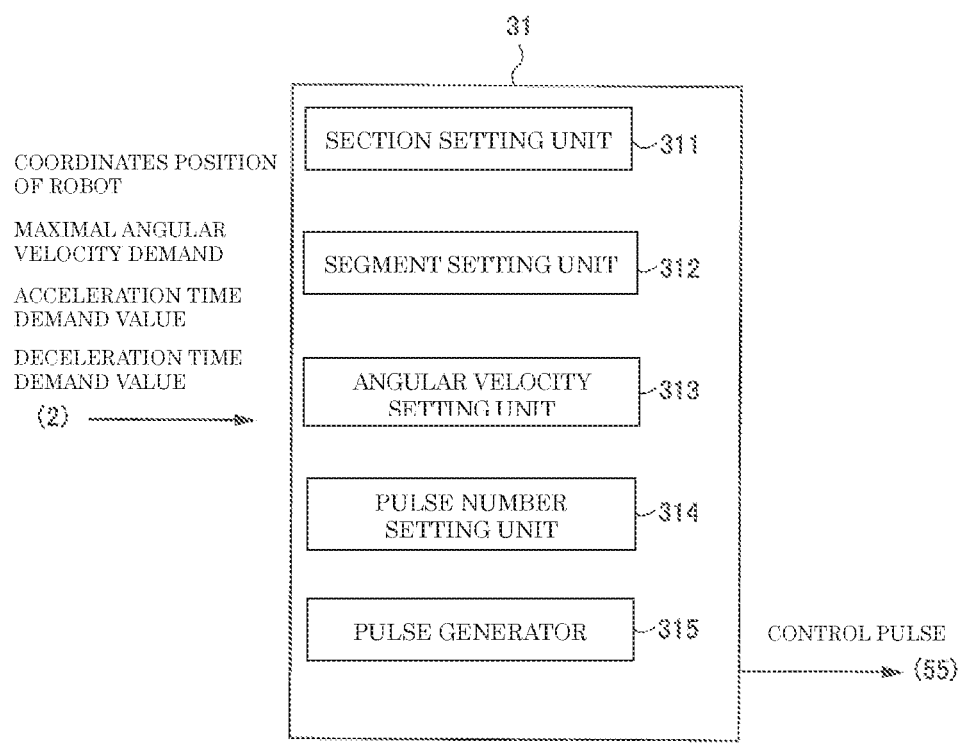
FIG. 3 is a functional block diagram of a robot control apparatus according to the first example embodiment of the present disclosure.

Next, a function realized through the execution of the robot program by the controller 31 of the robot control apparatus 3 will be described with reference to FIGS. 3 to 8. FIG. 3 is a functional block diagram of the robot control apparatus 3 of the present example embodiment.

As shown in FIG. 3, functions are realized by the robot control apparatus 3 including a section setting unit 311, a segment setting unit 312, an angular velocity setting unit 313, a pulse number setting unit 314, and a pulse generator 315. The functions of the above-described parts will be sequentially described below.

A case in which the reference point of the robot R is pseudo-linearly moved from a start point A to an end point B will be described below. In the following description, the start point A and the end point B are appropriately referred to as point A and point B, respectively.

As described above, the teaching point or the operating parameter of the robot R is set in the robot program of the robot control apparatus 3 received from the information processor 2. In the robot program of the present example embodiment, the start point A and the end point B are set as teaching points, and an acceleration time, a maximal angular velocity, and a deceleration time are set as operating parameters for movement from the start point A to the end point B.

In the following description, the acceleration time, the maximal angular velocity, and the deceleration time, which are set as the operating parameters, are referred to as "an acceleration time demand value," "a maximal angular velocity demand value," and "a deceleration time demand value," respectively. The acceleration time demand value is a demand value of an acceleration time until the reference point of the robot R is accelerated from the start point A to reach a maximal angular velocity (the maximal angular velocity demand value which is an example of a predetermined angular velocity). The deceleration time demand value is a demand value of a deceleration time until the reference point of the robot R is decelerated from a maximal angular velocity to reach the end point B.

In the following description, a joint of which angle variance around a central axis of each of the six joints of the robot R becomes maximum is referred to as a "main joint." A joint becoming a main joint among the six joints may differ according to a time of interest or a range of interest in a linear movement from point A to point B.

The section setting unit 311 includes a function of setting an acceleration section in which the reference point of the robot R is accelerated from the start point A to reach a maximal angular velocity on a straight line connecting the start point A to the end point B, a constant velocity section in which the reference point of the robot R is maintained at the maximal angular velocity, and a deceleration section in which the reference point of the robot R is decelerated from the maximal angular velocity to reach the end point B.

In an example of the present example embodiment, the section setting unit 311 sets the acceleration section, the constant velocity section, and the deceleration section on the basis of the above-described acceleration time demand value and the above-described deceleration time demand value. A setting method of each of the above-described sections will be described below with reference to FIG. 4.

The purpose of the present example embodiment is to allow the robot R to move at high speed along a straight line AB, and when the robot R moves along the straight line AB according to the PTP control, a variation in velocity of the main joint is simulated with the passage of time.

Figure 4:
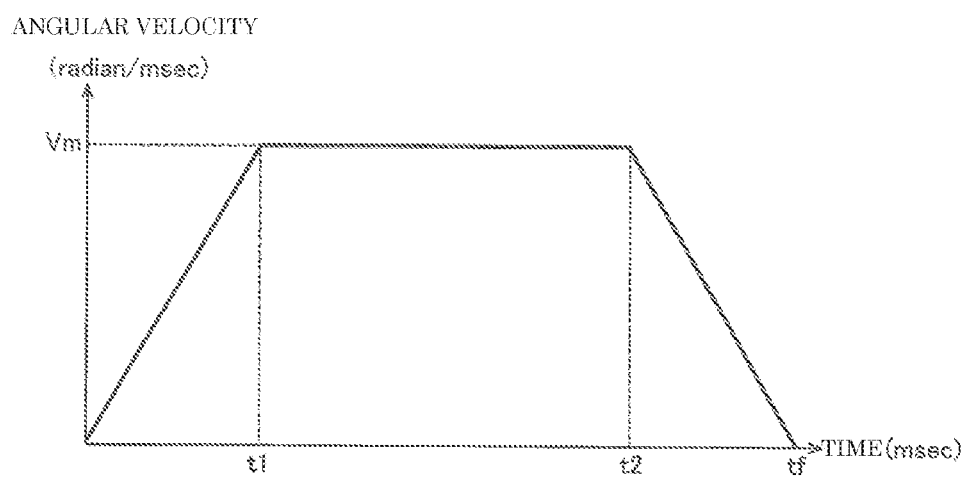
FIG. 4 is a graph showing a variation in angular velocity of a main joint with the passage of time when the main joint is moved according to point to point (PTP) control.

FIG. 4 is a graph showing a variation in angular velocity of a main joint with the passage of time when the main joint is moved along the straight line AB according to the PTP control. In FIG. 4, a time at which the robot R starts to move at point A and then reaches a maximal angular velocity demand value Vm corresponds to an acceleration time demand value t1, and a time tf-t2 in which the robot R starts to decelerate from a time t2 and reaches point B at a time tf corresponds to a deceleration time demand value.

In FIG. 4, tf denotes a total moving time when the robot R moves according to the PTP control.

Figure 5:
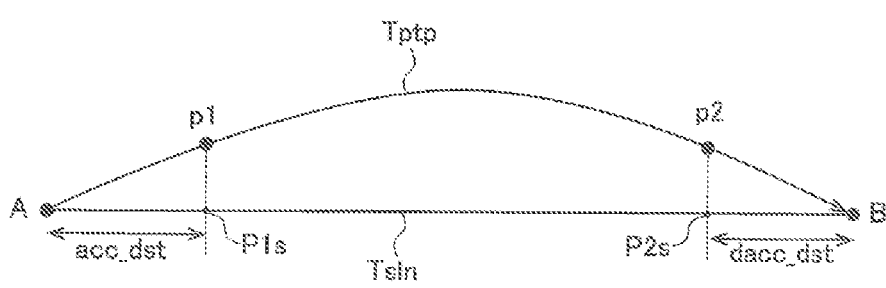
FIG. 5 is a diagram for describing an acceleration section and a deceleration section.

FIG. 5 shows a path $T_{ptp}$ generated when the robot R moves along the straight line AB according to the PTP control, and a path $T_{sln}$ generated when the robot R moves along the straight line AB according to linear interpolation control of the present example embodiment.

As shown in FIG. 5, the path $T_{ptp}$ generated when the robot R moves along the straight line AB according to the PTP control is not a straight line path but a curved path. In the path $T_{ptp}$, a section between point A and a point p1 is an acceleration section of the PTP control, a section between the point p1 and a point p2 is a constant velocity section of the PTP control, and a section between the point p2 and point B is a deceleration section in the PTP control.

The points p1 and p2 correspond to the times t1 and t2 of FIG. 4, respectively. That is, in the PTP control, a time from point A to the point p1 corresponds to the acceleration time demand value t1, and a time from the point p2 to point B corresponds to the deceleration time demand value tf-t2.

Even in the linear interpolation control, it is necessary to set an acceleration section and a deceleration section on the straight line AB to satisfy an acceleration time demand value and a deceleration time demand value. Thus, when the robot R moves from point A to point B according to the PTP control, an acceleration section and a deceleration section on a straight line in the linear interpolation control are set by projecting the point p1 which is an acceleration end position and the point p2 which is a deceleration start position onto the straight line AB. In FIG. 4, points p1s and p2s are points obtained by projecting the points p1 and p2 on the path $T_{ptp}$ onto the straight line AB in the PTP control.

In the path $T_{sln}$ according to the linear interpolation control of the present example embodiment, a section from point A to the point p1s is set as the acceleration section and a section from the point p2s to point B is set as the deceleration section.

Here, a ratio of a distance acc_dst of the acceleration section to a distance between point A and point B is set to be equal to a ratio of a distance of the acceleration section on the path $T_{ptp}$ according to the PTP control (a distance between point A and the point p1) to a distance of the $T_{ptp}$. Similarly, a ratio of a distance dacc_dst of the deceleration section to the distance of the straight line AB is set to be equal to a ratio of a distance of the deceleration section on the path $T_{ptp}$ according to the PTP control (a distance between the point p2 and point B) to the distance of the $T_{ptp}$.

For example, when the ratio of the distance acc_dst of the acceleration section to the distance of the straight line AB in the path $T_{sln}$ is an acceleration section ratio acc_ratio, the acceleration section ratio acc_ratio is calculated by Equation 1.

Further, in Equation 1, t1 denotes an acceleration time demand value (msec), Vm denotes a maximal angular velocity demand value (radian), and maxdst denotes angle variance of a main joint. The angle variance of the main joint corresponds to an area of the trapezoid shown in FIG. 4.

$$\text{acc\_ratio} = \frac{t1 \times Vm}{2 \times maxdst} \quad (1)$$

Since an angle of each of the joints is linearly varied on the straight line AB, an angle p1[i] of each of the joints of the robot R (here, i is one of joint numbers 1 to 6) at the point p1 is calculated by Equation 2 using the acceleration section ratio acc_ratio.

Further, in Equation 2, A[i] denotes an angle (radian) of an $i^{th}$ joint at point A, and B[i] denotes an angle (radian) of the $i^{th}$ joint at point B.

$$p1[i] = \text{acc\_ratio} \times (B[i] - A[i]) + A[i] \quad (2)$$

Since the angle of each of the joints at the point p1 may be obtained through Equation 2, orthogonal coordinates of the point p1 may be calculated through forward kinematics. Further, the distance acc_dst of the acceleration section on the straight line AB (see FIG. 5) is calculated from values of the orthogonal coordinates of point A, point p1, and point B as follows.

Figure 6:
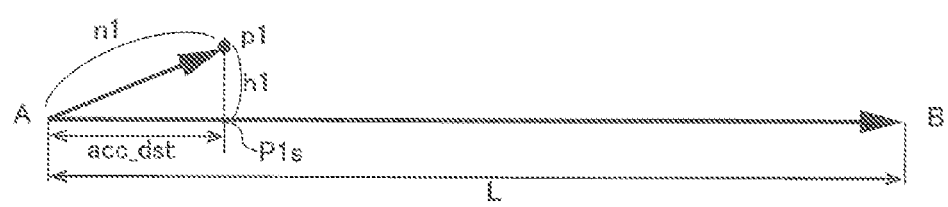
FIG. 6 is a diagram showing a variation in angular velocity by the PTP control with the passage of time.

As shown in FIG. 6, when a distance between the point p1 and the point p1s is h1, h1 is calculated by dividing a magnitude of a vector product of a vector from point A to the point p1 (p1 in bold of Equation 3) and a vector from point A to point B (AB in bold of Equation 3) by a distance L of the straight line AB according to Equation 3.

Further, when a magnitude of the vector from point A to the point p1 is n1, the distance acc_dst of the acceleration section is calculated according to Equation 4.

$$h1 = \frac{(p1 \times AB)}{L} \quad (3)$$

$$\text{acc\_dst} = \sqrt{n1^2 - h1^2} \quad (4)$$

Although the method of calculating the distance acc_dst of the acceleration section has been described, the distance dacc_dst of the deceleration section (see FIG. 5) may be similarly calculated on the basis of the point p2.

Further, the distance of the constant velocity section by the linear interpolation operation is obtained by subtracting the distance acc_dst of the acceleration section and the distance dacc_dst of the deceleration section from the distance L of the straight line AB. That is, a distance cst_dst of the constant velocity section is calculated from Equation 5.

$$\text{cst\_dst} = L - \text{acc\_dst} - \text{dacc\_dst} \quad (5)$$

In FIG. 3, the segment setting unit 312 includes a function of dividing each of the acceleration section, the constant velocity section, and the deceleration section, which are set by the section setting unit 311, into a plurality of segments. In this case, the segment setting unit 312 sets segment distances of each of the acceleration section, the constant velocity section, and the deceleration section so as to substantially equalize moving times of the segments of the reference point of the robot R to each other.

Figure 7:
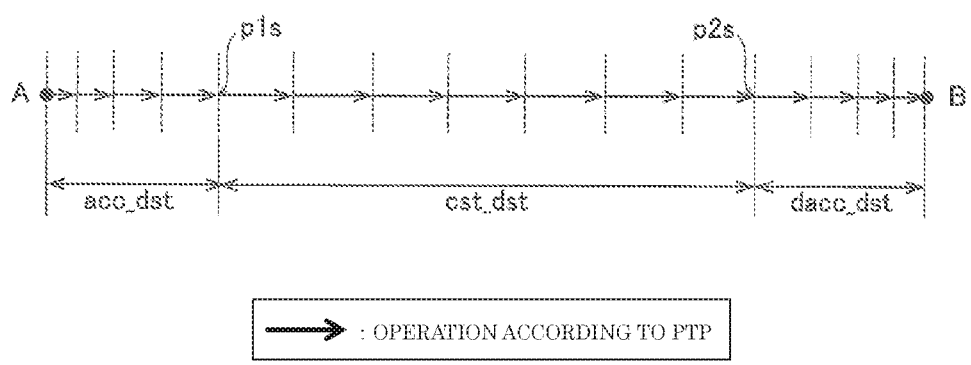
FIG. 7 is a diagram for describing a calculation method of the acceleration section.

A setting method of the segment distances of each of the acceleration section, the constant velocity section, and the deceleration section in the linear interpolation control according to the present example embodiment will be described below with reference to FIG. 7.

In the setting method, each of the segment distances may be determined in consideration of an error between a trajectory of the reference point of the robot R and an ideal straight line thereof, and in consideration of an operation time of the robot R. That is, when the segment distance becomes larger, since the PTP control is performed in each of the segments, the trajectory of the reference point of the robot R in each segment is discrepant from the ideal straight line such that the error tends to become larger. Meanwhile, since control for the robot R is performed at every reference time (e.g., 1 ms), when the segment distance is set to be small, a rounding error occurs in each of the segments, and the rounding error is accumulated by the number of segments so that an operating time is increased.

Therefore, in an exemplary example of dividing each of the distance acc_dst of the acceleration section, the distance dacc_dst of the deceleration section, and the distance cst_dst of the constant velocity section into a plurality of segments, a maximum value of the distance of one segment is set to be 20 mm or less and a distance of each of the plurality of segment is divided so as to not be remarkably short as compared to 20 mm.

First, in the acceleration section, a setting in which a distance of a segment is made to become longer gradually from point A to the point p1s so as to make a moving time in each of the segments as constant as possible.

That is, when the distance acc_dst of the acceleration section is 90 mm or less, the number of segments acc_seg_num of the acceleration section is set to 9, and when the distance acc_dst of the acceleration section is more than 90 mm, the number of segments acc_seg_num is calculated by Expression 6.

$$\text{acc\_seg\_num} = \frac{\text{acc\_dst}}{10} \quad (6)$$

When a segment number of each of the segments is j (j=0, 1, 2, . . . ) from point A toward the point p1s in the acceleration section, a distance acc_seg[j] of each of the segments is set by Equation 7.

$$\text{acc\_seg}[j] = \frac{2 \times \text{acc\_dst} \times (j+1)}{\text{acc\_seg\_num} \times (\text{acc\_seg\_num} + 1)} \quad (7)$$

Then, in the deceleration section, a setting is made in which a distance of a segment is made to become shorter gradually from the point p2s to point B so as to make a moving time in each of the segments as constant as possible.

That is, when a distance dacc_dst of the deceleration section is 90 mm or less, the number of segments dacc_seg_num of the deceleration section is set to 9, and when the distance dacc_dst of the deceleration section is more than 90 mm, the number of segments dacc_seg_num is calculated by Expression 8.

$$\text{dacc\_seg\_num} = \frac{\text{dacc\_dst}}{10} \quad (8)$$

When a segment number of each of the segments is j (j=0, 1, 2, . . . ) from the point p2s to point B in the deceleration section, a distance dacc_seg[j] of each of the segments is set by Equation 9.

$$\text{dacc\_seg}[j] = \frac{2 \times \text{dacc\_dst} \times (\text{dacc\_seg\_num} - j)}{\text{dacc\_seg\_num} \times (\text{dacc\_seg\_num} + 1)} \quad (9)$$

Lastly, in the constant velocity section, a distance of each of the segments is set to be constant and is set to 20 mm or less.

Specifically, when a value obtained by dividing a distance cst_dst of the constant velocity section by 20 is less than 1.25, the number of segments cst_seg_num of the constant velocity section is set to 1. When a value obtained by dividing the distance cst_dst of the constant velocity section by 20 is greater than or equal to 1.25, the number of segments cst_seg_num of the constant velocity section is calculated by Equation 10. The distance of each of the segments is shown in Expression 11.

$$\text{cst\_seg\_num} = \frac{\text{cst\_dst}}{20} + 1 \qquad (10)$$

$$\text{cst\_seg} = \frac{\text{cst\_dst}}{\text{cst\_seg\_num}} \qquad (11)$$

Further, the above-described setting of the distance of each of the segments is merely an example, and the above-described setting may be appropriately modified. For example, as shown in Equation 7, the distance of each of the segments in the acceleration section is set such that a distance between adjacent segments is increased twice, but the present disclosure is not limited thereto. A ratio of the distances between adjacent segments may be appropriately adjusted. Similarly, a ratio of the distances between adjacent segments in the deceleration section may be appropriately adjusted.

When the reference point is moved in each of the segments according to the PTP control, the angular velocity setting unit 313 includes a function of setting an angular velocity of each of the segments on the basis of variance in angle of a joint of which variance in angle becomes maximum with respect to each of the segments in each of the acceleration section, the constant velocity section, and the deceleration section.

Figure 8:
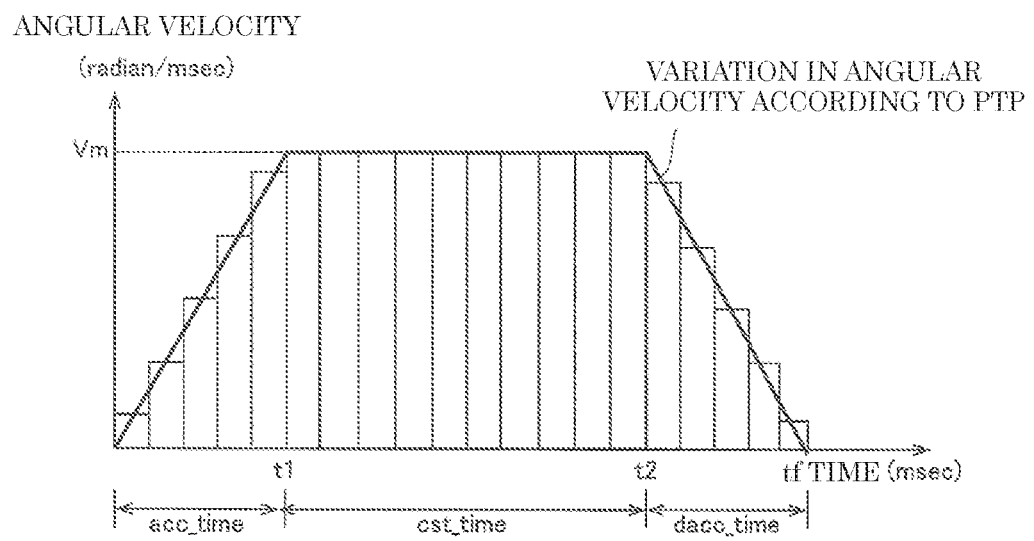
FIG. 8 is a graph showing a variation in angular velocity with the passage of time according to a robot control method of the first example embodiment of the present disclosure.

A method of setting an angular velocity of a main joint of each of segments in the acceleration section, the constant velocity section, and the deceleration section which are set by the segment setting unit 312 will be described below with reference to FIG. 8. FIG. 8 is a graph showing a variation in angular velocity with the passage of time according to a robot control method of the first example embodiment, and an angular velocity of a main joint of each of the segments is shown in a bar shape.

As described above, the purpose of linear interpolation control of the present example embodiment is to allow the robot R to move along the straight line AB, and when the robot R moves along the straight line AB according to the PTP control, a variation in velocity of the main joint is simulated with the passage of time. A bold line of a trapezoid shape in FIG. 8 is identical to that shown in FIG. 4, the bold line shows a variation in velocity of the main joint when the robot R operates between point A and point B according to the PTP control, and the variation in velocity thereof is simulated with a linear interpolation operation of the present example embodiment. That is, in the present example embodiment, an angular velocity of the main joint in each of the segments is set to coincide with a variation in angular velocity of the main joint in the PTP control.

Further, the angular velocity of the main joint in each of the segments is set to be constant.

In the linear interpolation control of the present example embodiment, a main joint is specified for each of the segments (i.e., a joint in which variance in angle in each of the segments becomes maximum). As described above, since the distance of each of the segments is set and known, an angle of each of the joints of the robot R at an end position of each of the segments is calculated by inverse kinematics, and thus a main joint of which variance in angle becomes maximum is specified.

When a segment number in the acceleration section is j (j=0, 1, 2, . . . ), a time t at the end position of each of the segments is calculated by Equation 12.

Further, in Equation 12, maxdst_seg[j] denotes variance in angle of a main joint in a segment with a segment number j, jcur denotes a current segment number, t1 denotes an acceleration time demand value (msec), and Vm denotes a maximal angular velocity demand value (radian).

$$t = \sqrt{\frac{2 \times \sum_{j=0}^{jcur} \text{maxdst\_seg}[j] \times t1}{Vm}} \qquad (12)$$

When a segment number in the constant velocity section is j (j=0, 1, 2, . . . ), a time t at the end position of each of the segments is calculated by Equation 13.

$$t = \frac{\sum_{j=0}^{jcur} \text{maxdst\_seg}[j]}{Vm} + \frac{t1}{2} \qquad (13)$$

When a segment number in the deceleration section is j (j=0, 1, 2, . . . ), a time t at the end position of each of the segments is calculated by Equation 14.

Further, in Equation 14, total_dst denotes variances in angle of overall main joints (from point A to point B), t2 denotes a deceleration time demand value (msec), and tf denotes a total moving time (msec). The total_dst is equal to an area of a trapezoid indicated by the bold line in FIG. 8.

$$t = tf - \sqrt{\frac{2 \times \left(\text{total\_dst} - \sum_{j=0}^{jcur} \text{maxdst\_seg}[j]\right) \times (tf - t2)}{Vm}} \qquad (14)$$

As described above, after calculating the time t at the end position of each of the segments in each of the acceleration section, the constant velocity section, and the deceleration section, an angular velocity of a main joint in each of the segments is calculated by Equation 15. In Equation 15, when j=0, t[j-1] becomes zero.

$$\text{speed}[j] = \frac{\text{maxdst\_seg}[j]}{t[j] - t[j-1]} \qquad (15)$$

In FIG. 3, the pulse number setting unit 314 has a function of setting the number of pulses per predetermined time according to the angular velocity of each of the segments set by the angular velocity setting unit 313. The pulse generator 315 has a function of generating a control pulse supplied to a motor driving each of the joints of the robot R. In this case, the number of control pulses is set to the number of pulses set by the pulse number setting unit 314.

That is, when the angular velocity of each of the segments is determined, the number of control pulses for controlling the robot R according to the determined angular velocity is set at every reference time (e.g., 1 ms). A method of determining the number of pulses may employ any method as long as it can determine the number of control pulses obtaining the determined angular velocity. For example, the number of control pulses may be calculated by a predetermined function calculation using the determined angular velocity as a variable or may be obtained by referring to a predetermined look-up table.

Figure 9:
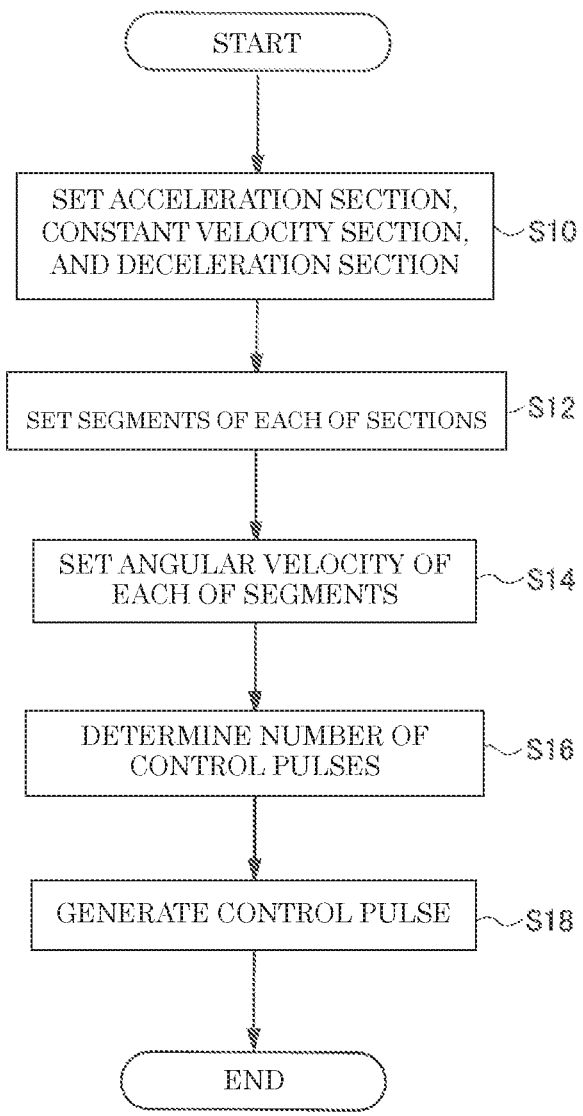
FIG. 9 is a flowchart executed by the robot control apparatus of the first example embodiment of the present disclosure.

Next, a processing flow of the robot control apparatus of the present example embodiment will be described with reference to FIG. 9. FIG. 9 is a flowchart executed by the robot control apparatus3 of the present example embodiment.

As described above, the robot control apparatus 3 acquires the robot program from the information processor 2, and the controller 31 of the robot control apparatus 3 executes the acquired robot program to perform each of operations shown in FIG. 9. In the robot program, the start point A and the end point B are set as teaching points, and demand values of an acceleration time, a maximal angular velocity, and a deceleration time are set as operating parameters for movement from the start point A to the end point B.

The controller 31 of the robot control apparatus 3 performs the linear interpolation control for linearly moving the reference point of the robot R from the start point A to the end point B on the basis of the above-described operation parameters. In this case, a variation in angular velocity of the main joint on the straight line AB is made to coincide with a variation in angular velocity of the main joint when moved between point A and point B according to the PTP control so that an angular velocity of the main joint in each of the segments is determined.

The controller 31 of the robot control apparatus 3 first sets an acceleration section, a constant velocity section, and a deceleration section on the basis of the acceleration time demand value, the deceleration time demand value, and the maximal angular velocity demand value which are set in the robot program (operation S10). The setting of the acceleration section, the constant velocity section, and the deceleration section are determined by equaling a ratio of the acceleration section, the constant velocity section, and the deceleration section to a ratio thereof when the main joint is moved between point A and point B according to the PTP control.

Subsequently, the controller 31 sets a plurality of segments for each of the acceleration section, the constant velocity section, and the deceleration section which are set in operation S10 (operation S12). That is, each of the acceleration section, the constant velocity section, and the deceleration section on the straight line AB is divided into the plurality of segments, and thus a distance of each of the plurality of segments is determined. As described above, the controller 31 determines the distance of each of the segments such that moving times of the segments are substantially constant. In the acceleration section, the distance of each of the segments is set to be longer from the point A to the point B according to an increase of a speed, whereas in the deceleration section, the distance of each of the segments is set to be shorter toward the point B according to a decrease of the speed.

Subsequently, the controller 31 sets an angular velocity of the main joint in each of the segments (operation S14). As described above, the angular velocity of the main joint in each of the segments is determined to coincide with a variation in angular velocity of the main joint moved between point A and point B according to the PTP control.

With the processes in operations S10 to S14, the angular velocity of the main joint in each of the segments is set when the reference point of the robot R is moved from the start point A to the end point B by the linear interpolation. Subsequently, the controller 31 of the robot control apparatus 3 determines the number of control pulses (operation S16) so as to obtain the angular velocity of the main joint in each of the segments, which is set in operation S14, and generates the determined number of control pulses (operation S18) to transmit the generated pulses to the robot R.

As described above, in the robot system 1 of the present example embodiment, when the reference point of the robot R is moved by the linear interpolation, the robot control apparatus 3 controls the variation in angular velocity of the main joint of the robot R to be equal to the variation in angular velocity of the main joint moved along the straight line AB according to the PTP control. Consequently, when the robot R is linearly moved, the robot R may be moved at high speed.

Figure 10:
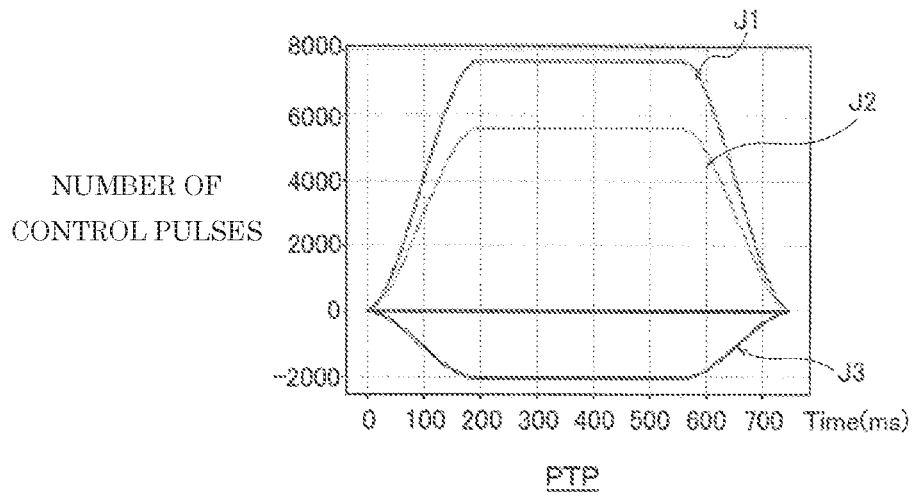
FIG. 10 is a graph for describing a variation in the number of control pulses with the passage of time in the PTP control and the control according to the first example embodiment of the present disclosure.
Figure 10:
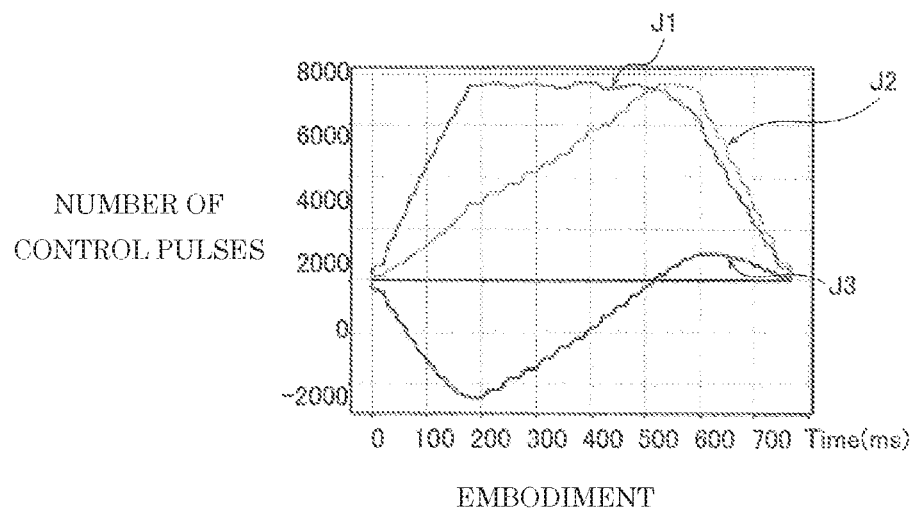

FIG. 10 shows simulation results of the number of control pulses, which is varied with the passage of time in a case in which a robot is moved between two exemplary points according to the PTP control and in a case in which the robot is moved between the two exemplary points according to the linear interpolation of the present example embodiment. In FIG. 10, the number of control pulses at every 1 ms is shown for main joints J1, J2, and J3, each having a highest angular velocity, among the six joints of the robot R. As shown in FIG. 10, it can be seen that the number of control pulses for the main joint J1 in the PTP control is substantially equal to the number of control pulses for each of the main joint J1 (until about 500 ms) and the main joint J2 (after about 500 ms) in the linear interpolation of the present example embodiment, and the moving times between the two points are substantially equal to each other. That is, it was confirmed that the linear interpolation control according to the present example embodiment may achieve the movement speed equal to that in a case in which the robot R is moved in the overall section according to the PTP control.

Next, a second example embodiment will be described.

In the first example embodiment, the acceleration section and the deceleration section are set on the basis of a variance in angle of the main joint entirely moved from the start point A to the end point B according to the PTP control. However, in the acceleration period and the deceleration period, the main joint is specified in a segment unit, and there may be a case in which the specified main joint does not coincide with the main joint moved in the overall section according to the PTP control. In such a case, an amount of movement of the main joint obtained by summing an amount of movement of the main joint in a segment unit for all the segments becomes larger than an amount of movement of the main joint moved in the overall section according to the PTP control so that a total moving time according to the present example embodiment may become longer. That is, a term of $\Sigma$ in each of Equations 12 and 14 increases, and the time t at the end position of each of the segments is retarded so that the total moving time may become longer.

Therefore, the present example embodiment is characterized in that segments of the acceleration section and/or the deceleration section are reset on the basis of the variance in angle of the main joint in each of the segments so as to satisfy the acceleration time demand value and the deceleration time demand value.

When a first difference value, which is obtained by subtracting the acceleration time demand value from the acceleration time according to the angular velocity of each of the segments set by the angular velocity setting unit 313, is greater than a first threshold value, the segment setting unit 312 of the present example embodiment resets the number of segments in the acceleration section or a distance of each of the segments so as to obtain a first difference value that is equal to or less than the first threshold value.

Further, when a second difference value, which is obtained by subtracting the deceleration time demand value from the deceleration time according to the angular velocity of each of the segments set by the angular velocity setting unit 313, is greater than a second threshold value, the segment setting unit 312 of the present example embodiment resets the number of segments in the deceleration section or a distance of each of the segments so as to obtain a second difference value that is equal to or less than the second threshold value.

Furthermore, each of the first threshold value and the second threshold value may be appropriately set according to an allowable level in a system for discrepancy with respect to the acceleration time demand value and the deceleration time demand value.

Figure 11:
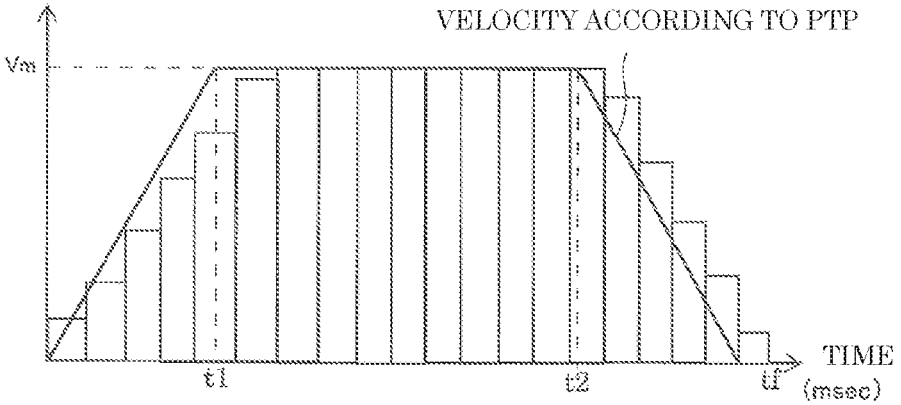
FIG. 11 is a graph showing a variation in angular velocity with the passage of time before and after a segment adjustment in a robot control method according to a second example embodiment of the present disclosure.
Figure 11:
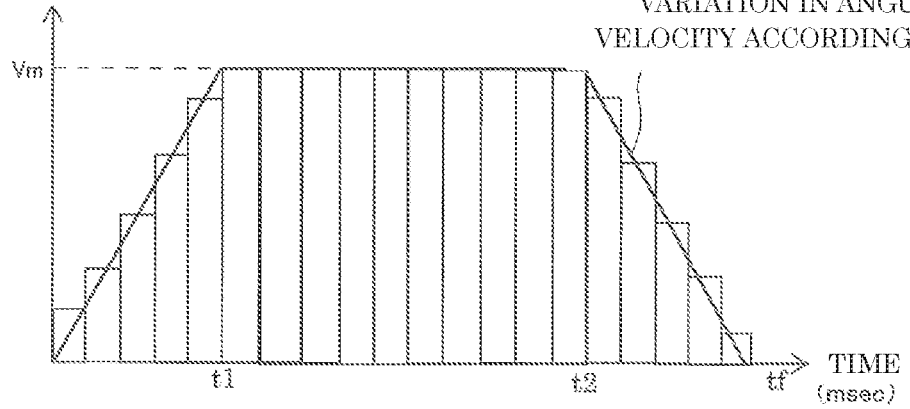

An example of resetting the number of segments or a distance of each of the segments, which is performed by the segment setting unit 312 of the present example embodiment, will be described below with reference to FIG. 11. FIG. 11 is a graph showing a variation in angular velocity of a main joint with the passage of time before and after a segment adjustment in a robot control method according to the present example embodiment.

In FIG. 11, before the segment adjustment, since a main joint specified with respect to each of the segments in the acceleration section does not coincide with the main joint moved according to the PTP control, the acceleration time according to the linear interpolation control becomes longer than an acceleration time demand value t1. Therefore, a total moving time tf becomes longer.

On the other hand, in the present example embodiment, the segment setting unit 312 shortens the distance of each of the segments in the acceleration section or reduces the number of segments such that the acceleration section meets the following conditional expression 16. For example, the distance of each of the segments may be adjusted by varying integers of Equations 6 and 7.

Further, in the conditional expression 16, maxdst_seg[j] denotes variance in angle of a main joint in a segment with a segment number j, jcur denotes a current segment number, t1 denotes an acceleration time demand value (msec), and Vm denotes a maximal angular velocity demand value (radian).

$$\frac{2 \times \sum_{j=0}^{jcur} \text{maxdst\_seg}[j]}{Vm} \leq t1 \quad (16)$$

In the distance of each of the segments in the acceleration section before the segment adjustment, since the angular velocity set to each of the segments is faster than that indicated by the bold line according to the PTP control in FIG. 11, the conditional expression 16 is not satisfied.

Thus, since the distance of each of the segments in the acceleration section is shortened or the number of segments of the acceleration time is decreased, it is possible to satisfy the conditional expression 16. As a result, as shown in FIG. 11, in the acceleration section after the segment adjustment, it can be seen that the acceleration becomes slower as compared to before the segment adjustment, thereby satisfying the acceleration time demand value.

For example, a value obtained by subtracting the left side from the right side of the conditional expression 16 is the first difference value.

Similarly, before the segment adjustment, since a main joint specified with respect to each of the segments in the deceleration section does not substantially coincide with the main joint moved according to the PTP control, as in the acceleration section, there may be a case in which the total moving time according to the present example embodiment becomes longer.

Thus, the segment setting unit 312 shortens the distance of each of the segments in the deceleration section or reduces the number of segments, thereby satisfying the following conditional expression 17. For example, the distance of each of the segments may be adjusted by varying integers of Equations 8 and 9.

Further, in the conditional expression 17, maxdst_seg[j] denotes variance in angle of a main joint in a segment with a segment number j, jcur denotes a current segment number, t2 denotes a deceleration time demand value (msec), tf denotes a total travel time (msec), and Vm denotes a maximal angular velocity demand value (radian).

For example, a value obtained by subtracting the left side from the right side of the conditional expression 17 is the second difference value.

$$\frac{2 \times \sum_{j=jmax}^{jcur} \text{maxdst\_seg}[j]}{Vm} \leq (tf - t2) \quad (17)$$

Figure 12:
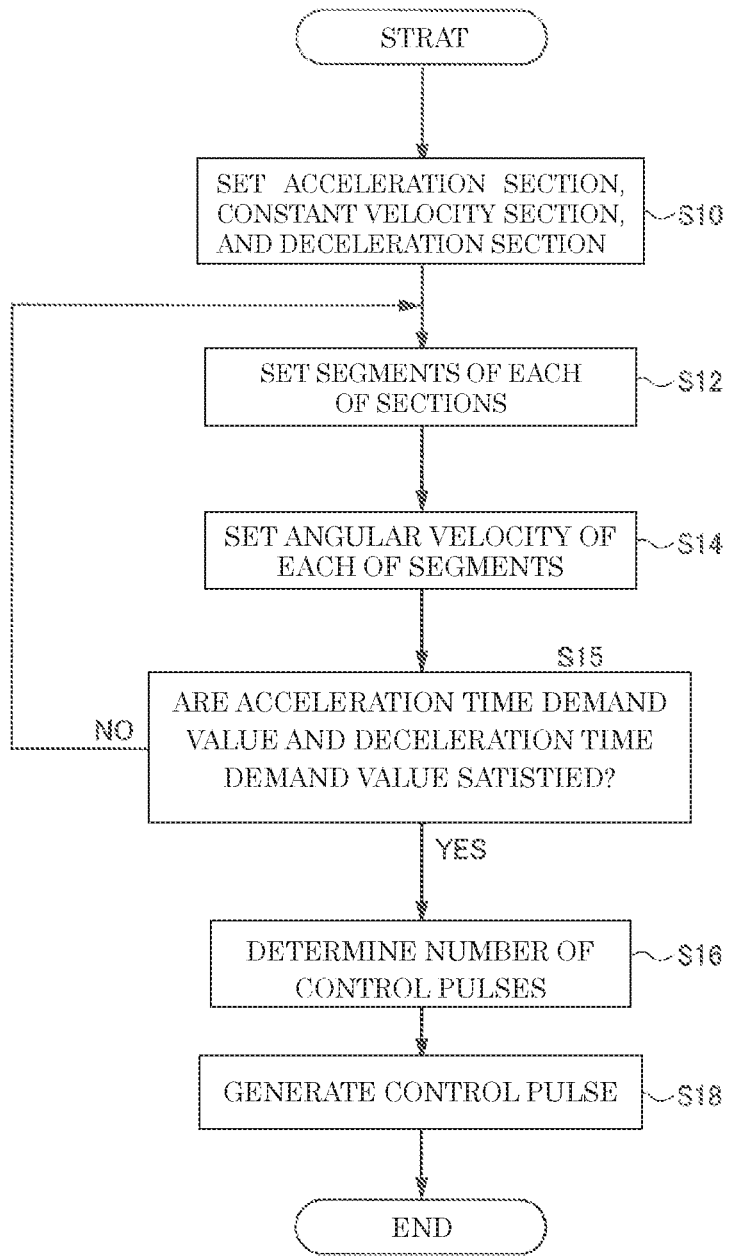
FIG. 12 is a flowchart executed by the robot control apparatus of the first example embodiment of the present disclosure.

The processing flow of the robot control apparatus 3 of the present example embodiment is shown in FIG. 12. FIG. 12 is a flowchart executed by the robot control apparatus 3 of the present example embodiment.

A difference between the flowchart shown in FIG. 12 and that shown in FIG. 9 is that operation S15 is added.

When the angular velocity of the main joint in each of the segments is set (operation S14), the controller 31 of the robot control apparatus 3 determines whether the acceleration time demand value and the deceleration time demand value are satisfied (i.e., the conditional expressions 16 and 17) (operation S15). When it is determined that the acceleration time demand value and the deceleration time demand value are not satisfied, the procedure returns to operation S12 to vary the number of segments in the acceleration section and/or the deceleration section or vary the distance of each of the segments. Operations S12 and S14 are repeatedly performed until the conditional expressions 16 and 17 of operation S15 are satisfied.

In this case, in operation S15, a sum condition may be a case in which a value obtained by subtracting the left side from the right side of the conditional expression 16 is less than or equal to a predetermined first threshold value and a value obtained by subtracting the left side from the right side of the conditional expression 17 is less than or equal to a predetermined second threshold value.

Next, a third example embodiment will be described.

Since the angular velocity of the main joint set by the robot control apparatus 3 of the first example embodiment is constant within each of the segments, there may be a case in which the angular velocity of the main joint may be significantly varied between the segments. However, a large variation in angular velocity is undesirable because vibration may occur at the robot R. Thus, in the present example embodiment, a variation in angular velocity of the main joint is smooth so as to prevent generation of vibration at the robot R.

From the above-described aspect, the robot control apparatus 3 of the present example embodiment further includes a filter processor for performing a filter process on a pulse number set by the pulse number setting unit 314. Further, the pulse generator 315 sets the number of the control pulse as the number of pulses after the filter process.

A method of the filter process is not particularly limited. For example, the method may employ a moving average filter based on the number of pulses which is set for a predetermined number of reference times (e.g., 1 ms). The number of samples for the number of pulses used in the moving average filter is not limited. However, in order to enhance an effect of smoothing, it is preferable that the number of samples is sufficiently large, whereas when the number of samples is excessively large, the moving time becomes longer. In an exemplary example, the number n of samples is ten.

Specifically, when the number of $k^{th}$ control pulses for a joint of a joint number i (i=1 to 6) is pls_new[i][k], the number of pulses pls_new[i][k] is obtained by Equation 18.

Further, in Equation 18, pls_new denotes the number of control pulses after application of the moving average filter, pls denotes the number of control pulses before application of the moving average filter, i denotes a joint number (1, 2, 3, 4, 5, or 6), k denotes the number of generation of an operation pulse, and n denotes the number of samples used for a moving average.

$$\text{pls\_new}[i][k] = \frac{(pls[i][k - (n - 1)] + pls[i][k - (n - 2)] + \ldots + pls[i][k])}{n} \quad (18)$$

As described above, a plurality of exemplary embodiments of the robot control apparatus of the present disclosure have been described in detail, but the present disclosure is not limited to the above-described exemplary embodiments. Further, the above-described exemplary embodiments can be improved or modified in various ways without departing from the gist of the present disclosure. For example, the technical details described for the respective exemplary embodiments may be appropriately combined between different example embodiments as long as technical contradictions do not occur.

A program for realizing at least some functions of the functions described in the functional block diagram of FIG. 3 and a computer readable storage medium (including a nonvolatile storage medium) in which the program is stored can be understood by those skilled in the art.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A robot control apparatus for moving a reference point of an articulated robot including a plurality of joints from a start point to an end point by a linear interpolation, the robot control apparatus comprising:

section setting circuitry to set, on a straight line connecting the start point to the end point, an acceleration section in which the reference point is accelerated from the start point to reach a predetermined angular velocity, a constant velocity section in which the reference point is maintained at the predetermined angular velocity, and a deceleration section in which the reference point is decelerated from the predetermined angular velocity to reach the end point;

segment setting circuitry to divide each of the acceleration section, the constant velocity section, and the deceleration section into a plurality of segments and to set segment distances of each of the acceleration section, the constant velocity section, and the deceleration section so as to equalize or substantially equalize moving times of reference points corresponding to each of the acceleration section, the constant velocity section, and the deceleration section; and angular velocity setting circuitry to set, when the reference point is moved in each of the segments according to point to point control, an angular velocity of each of the segments based on a variance in angle of a main joint which has a greatest variance in angle among each of the segments in each of the acceleration section, the constant velocity section, and the deceleration section; wherein the point to point control controls a change in an angular velocity of the main joint to be equal to a change in angular velocity of the main joint along the straight line connecting the start point and the end point.

2. The robot control apparatus of claim 1, wherein the section setting circuitry sets the acceleration section, the constant velocity section, and the deceleration section based on an acceleration time demand value for which the reference point is accelerated from the start point to reach a predetermined angular velocity, and a deceleration time demand value for which the reference point is decelerated from the predetermined angular velocity to reach the end point.

3. The robot control apparatus of claim 1, further comprising:

a pulse number setting circuitry to set a number of pulses per predetermined time according to the angular velocity of each of the segments set by the angular velocity setting circuitry;

a filter processing circuitry to perform a filter process on the number of pulses set by the pulse number setting circuitry; and pulse generating circuitry to generate a control pulse supplied to a motor to drive each of the joints of the robot and to set a number of control pulses as the number of pulses after the filter process.

4. The robot control apparatus of claim 3, wherein the filter process performs a moving average filter process based on the number of pulses set for a predetermined number of the predetermined times.

5. A robot control method for moving a reference point of an articulated robot including a plurality of joints from a start point to an end point by a linear interpolation, the robot control method comprising:

setting, on a straight line connecting the start point to the end point, an acceleration section in which the reference point is accelerated from the start point to reach a predetermined angular velocity, a constant velocity section in which the reference point is maintained at the predetermined angular velocity, and a deceleration section in which the reference point is decelerated from the predetermined angular velocity to reach the end point;

dividing each of the acceleration section, the constant velocity section, and the deceleration section into a plurality of segments and setting segment distances of each of the acceleration section, the constant velocity section, and the deceleration section so as to equalize or substantially equalize moving times of reference points corresponding to each of the acceleration section, the constant velocity section, and the deceleration section; and when the reference point is moved in each of the segments according to point to point control, setting an angular velocity of each of the segments based on a variance in angle of a main joint which has a greatest variance in angle among each of the segments in each of the acceleration section, the constant velocity section, and the deceleration section; wherein the point to point control controls a change in an angular velocity of the main joint to be equal to a change in angular velocity of the main joint along the straight line connecting the start point and the end point.

6. A non-transitory computer-readable medium including a program that is executable by a computer to perform a method of moving a reference point of an articulated robot including a plurality of joints from a start point to an end point by a linear interpolation, the method comprising:

setting, on a straight line connecting the start point to the end point, an acceleration section in which the reference point is accelerated from the start point to reach a predetermined angular velocity, a constant velocity section in which the reference point is maintained at the predetermined angular velocity, and a deceleration section in which the reference point is decelerated from the predetermined angular velocity to reach the end point;

dividing each of the acceleration section, the constant velocity section, and the deceleration section into a plurality of segments and setting segment distances of each of the acceleration section, the constant velocity section, and the deceleration section so as to equalize or substantially equalize moving times of reference points corresponding to each of the acceleration section, the constant velocity section, and the deceleration section; and when the reference point is moved in each of the segments according to point to point control, setting an angular velocity of each of the segments based on a variance in angle of a main joint which has a greatest variance in angle among each of the segments in each of the acceleration section, the constant velocity section, and the deceleration section; wherein the point to point control controls a change in an angular velocity of the main joint to be equal to a change in angular velocity of the main joint along the straight line connecting the start point and the end point.

* * * * *